3,004,912
DESULFURIZATION PROCESS UTILIZING METALLIC SODIUM AND RECYCLING OF SLUDGE

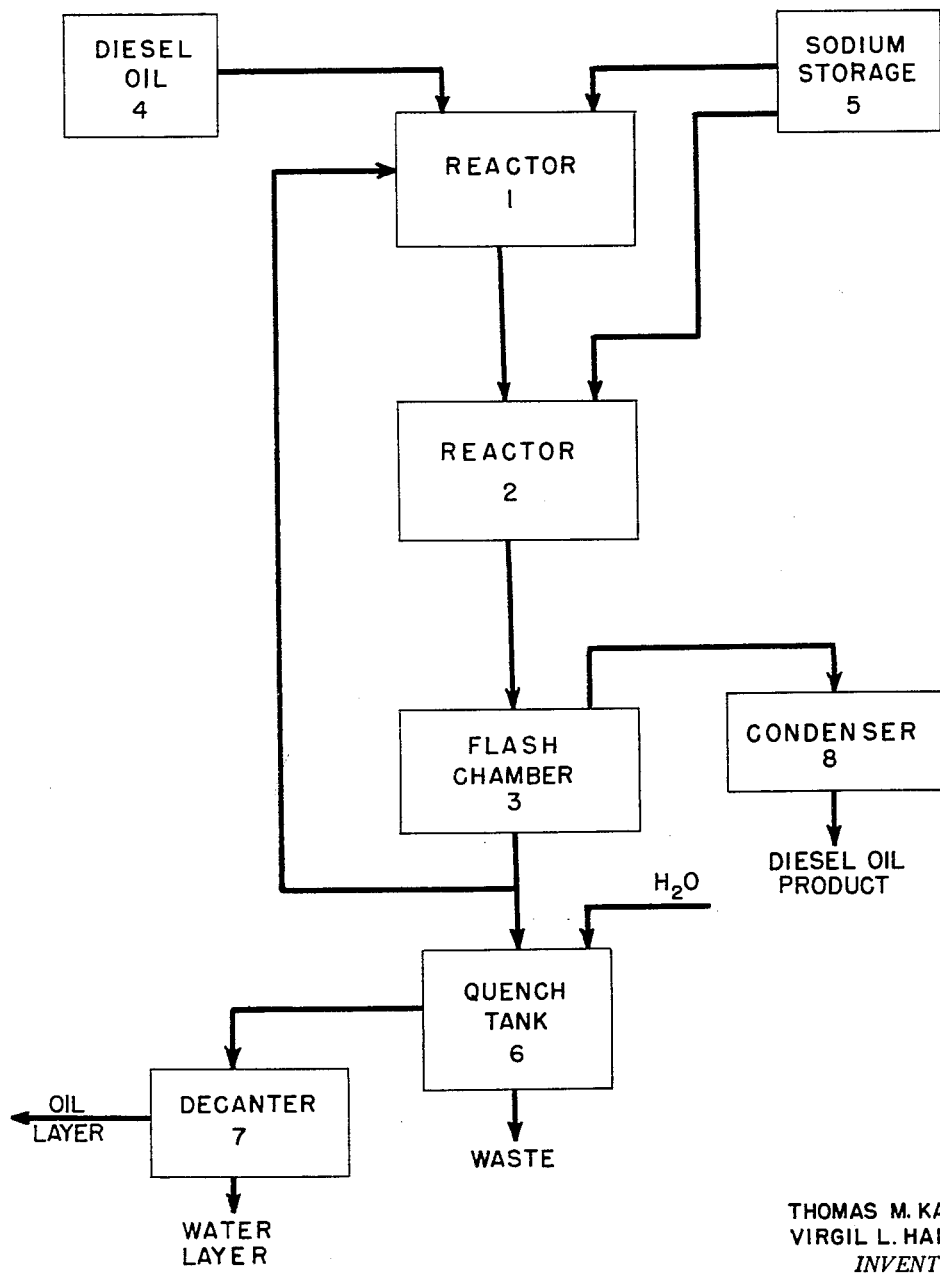

Thomas M. Kaneko and Virgil L. Hansley, Cincinnati, Ohio, assignors to National Distillers and Chemical Corporation, New York, N.Y., a corporation of Virginia
Filed Apr. 13, 1959, Ser. No. 806,059
5 Claims. (Cl. 208—208)

This invention relates to a new and improved desulfurization process. More particularly, the invention pertains to the desulfurization of diesel oil by a metallic agent such as sodium.

Most of the processes proposed recently for the desulfurization of petroleum and petroleum fractions such as diesel oil have been based on hydrogenation, i.e. the reaction of hydrogen with the sulfur-containing organic compounds to form removable hydrogen sulfide. Operating temperatures and pressures are in the range of 500° to 800° F. and 100 to 1000 p.s.i.g. All of these processes utilize catalysts or combinations of catalysts such as cobalt, molybdenum, platinum, nickel or tungsten sulfides. Obviously such processes require an available source of hydrogen gas. Furthermore, high pressures are required for the hydrogenation of the sulfur compounds and relatively large installations are needed for economic operations. Various metals, particularly the alkali metals, have been also used or proposed as refining agents for petroleum or petroleum fractions. The use of metallic sodium either alone or in combination with hydrogen has been especially preferred. See, for example, U.S. Patent No. 1,952,616 and U.S. Patent No. 1,938,672. However, these processes have the disadvantage of requiring the use of excess metallic sodium in order to obtain effective desulfurization and/or complete use of the refining agent. In addition, these and other related processes require elaborate re-use or separation techniques for recovering the excess alkali metal; an economic necessity in view of the continual use of excess alkali metal. The amount of sodium employed was primarily determined on the basis of removing the undesirable sulfur constituents as sodium sulfide ($Na_2S$).

One object of this invention is to provide an economical method for the desulfurization of diesel oil which does not involve hydrogenation. Another object of this invention is to provide a method for desulfurizing diesel oil with metallic sodium which avoids the difficulties encountered in the prior art processes. A still further object of this invention is to provide a desulfurization process which does not require the use of excess metallic sodium. Other objects will become apparent from the ensuing description of the invention.

In accordance with the present invention, it has now been found that diesel oil can be desulfurized to acceptable limits by utilizing less than stoichiometric amounts of sodium and certain specific processing steps. By operating in the prescribed manner, it was further found that one gram atom of sulfur is removed per gram atom of metallic sodium used, i.e. about one half the amount theoretically required to remove the sulfur impurities as sodium sulfide. Consequently, the over-all use of excess or a large excess of metallic sodium, which was deemed to be essential in the prior art processes, is not required in the present process. The hydrogen atmosphere and the high pressures also considered to be essential for effective desulfurization of diesel oil are not needed in the process of this invention. As hereinafter shown, one important feature of the instant process is use of the sludge obtained from a prior operation to aid in the desulfurization. In general, the sludge contains active sodium-containing solids and high boiling point polymer by-products, which also appears to contain useable sodium for eliminating further sulfur; although the exact nature of the sludge and compounds contained therein has not been determined. A portion of the treated diesel oil may also be recycled in conjunction with the sludge.

The invention will be more fully understood by reference to the drawing, which is a diagrammatic representation of one method of carrying out the present process. In actual operations for a continuous process, the diesel oil and metallic sodium are fed to reactor 1 from storage chambers 4 and 5, respectively, wherein they are thoroughly agitated by a propeller-type agitator (not shown) rotating at a speed of about 600 to 800 r.p.m. The temperature in reactor 1 is maintained at a range of about 200° to 250° C., while the autogenous pressure will range from about 10 to 30 p.s.i.g. During starting up operations all of the sodium required to desulfurize the diesel oil to the acceptable level, usually less than about 0.5% by weight of the diesel oil product, but depending on sulfur level of the crude oil feed will be added to reactor 1; and following a reaction time period of about 0.8 to 1.5 hours, the resulting product mixtures will be fed directly to flash chamber 3 wherein the desulfurized diesel oil is separated from the sludge. Once the process has been placed on stream, however, the amount of sodium added to reactor 1 will be such that the product mixture removed therefrom will have a sulfur impurity content somewhat less than 50% of that in the diesel oil feed. When operating with two treatment zones, it is possible to feed fresh sodium only to the second zone following start up. The product mixture is then passed to reactor 2, operated at the same temperature, pressure and agitation conditions as reactor 1. Fresh sodium is fed to reactor 2 in an amount sufficient to reduce the sulfur content to the acceptable percentage. The retention time in reactor 2 will range from about 0.2 to 0.5 hour. After the reaction has been completed, the resulting product mixture is fed to flash chamber 3 operated at a temperature of about 250° to 300° C., preferably about 275° to 285° C. The diesel oil vapors recovered overhead are passed to condenser 8, which condenses the vapors at a temperature of about 75° to 150° C. Desulfurized diesel oil is recovered as shown.

A major proportion of the residue, averaging about 60% by weight of the residue, hereinafter called sludge, recovered from flash chamber 3 is recycled directly back to reactor 1 to aid in the desulfurization of the fresh diesel oil. In order to prevent the build up of high boiling polymer oils and solids in the desulfurization system, however, a purge stream constituting about 40% by weight of the total weight of sludge is continuously withdrawn and, as shown in the drawing, passed to quench tank 6 wherein it is contacted with steam and water. The resulting mixture is next passed to decanter 7 where oil and water layers separate and are recovered. If desired, a portion of all of the oil layers can be recycled to reactor 1 along with the major proportion of the sludge. It will be understood, however, that the high boiling polymer oil and the solids may be filtered from this recovered oil layer prior to recycling. Other methods for handling the purge stream may also be employed. Thus, for example, settling tanks or a filtration system may be utilized to separate the undesirable polymer oil and solids from the residual diesel oil. These alternate methods involve conventional techniques and apparatus and, therefore, they are not shown in the drawing.

When operating the inventive process in accordance with the above description, it is possible, for example, to effectively desulfurize a feed of 100 pounds of diesel oil per hour by utilizing a sodium feed of 0.863 pound per hour, equivalent to 1 gram atom of sodium per 1 gram atom of sulfur in the diesel oil feed. Approximately 20 pounds per hour of sludge is recycled to the reactor, and a desulfurized diesel oil product of about 95 pounds per hour is recovered from the flash chamber.

The diesel oil used as a feed material in the process of this invention may be derived from any crude petroleum oil such as the naphthenic base, paraffinic base, asphaltic base and mixed base crudes. In general, the diesel oil feed will have a sulfur content ranging from about 0.6 to 1.2% by weight. An analysis of a diesel oil feed obtained from an asphaltic crude is as follows:

| | |
|---|---|
| Sulfur, percent | 1.19 |
| Specific gravity @ 25° C | 0.8228 |
| Viscosity @ $d_4^{25}$, centipoise | 3.158 |
| Water, percent by wt | 0.0088 |
| Boiling point, ° C.: | |
| Initial | 186 |
| End | 304 |

For the purposes of this invention, desulfurization of the diesel oil feed to a sulfur content of less than about 0.5% by weight, and preferably about 0.3 to 0.5% by weight, is considered acceptable. These values are, of course, commensurate with the specification of commercial diesel oils.

The amount of metallic sodium employed in the process will range from about 0.014 to 0.042 pound per gallon, depending on the sulfur content of the diesel oil feed. As set forth above, one of the main advantages of this invention is the fact that approximately only 1 gram atom of sodium is needed to remove 1 gram atom of sulfur from the feed material. In accordance with another advantage of the present process, massive or bulk sodium may be employed without affecting the desulfurization. Thus, the use of "high surface sodium" as called for in previously proposed processes, is not required here. The temperatures and pressures employed during the desulfurization reaction are given above. With respect to the latter, it should be noted that superatmospheric pressures are unnecessary. The pressures in reactors 1 and 2 will be autogenous and will range from about 10 to 30 p.s.i., although it will vary somewhat with the volatility of the oil under treatment. In flash chamber 3 atmospheric pressures will be employed, and about 95% by weight of the reaction product mixture being heated therein will be vaporized by operating at temperatures within the range of about 250° to 300° C., preferably about 275° to 285° C.

An exact analysis of the sludge recovered from the bottom of flash chamber 3 has proven to be difficult. In general, however, the sludge will contain about 50% by weight of diesel oil, about 5% by weight of polymer oil having a high end boiling point, and about 45% by weight of solids. The sulfur content of the sludge will range from about 3 to 6% by weight.

The invention will be more fully understood by reference to the following illustrative examples.

EXAMPLE I

A crude diesel oil containing 1.2% by weight of sulfur was treated by the process which is diagrammatically illustrated in the drawing. The untreated diesel oil is pumped at a rate of 3,050 lbs./hr. into reactor 1 from diesel oil storage 4. The feed stream is preheated to a temperature of about 225° C. Though not shown in the drawing, the preheating can be accomplished by an indirect heat exchange between the diesel oil vapors existing from flash chamber 3 and the untreated diesel oil feed. A recycle stream of sludge and oil recovered from the bottom of the flash chamber is concurrently passed into reactor 1 at a rate of about 2,420 lbs./hr. The rate of recycle is determined by the amount of evaporation (approximately 75%) in the flash chamber 3, and the quantity of purge which is approximately 5% by weight of the total diesel oil feed. Metallic sodium is pumped at a controlled rate from sodium storage 5 into reactor 1. The rate is about 49.9 lbs./hr., which is sufficient to reduce the sulfur content of diesel oil feed from 1.2% to 0.5%. The temperature and pressure in reactor 1 is about 225° C. and 30 p.s.i., respectively. The resulting reaction product mixture is then passed to reactor 2 at a rate of about 10,870 lbs./hr. where it is contacted with about 17.4 lbs./hr. of fresh metallic sodium fed thereto from sodium storage 5. The temperature and pressure in this reactor will be the same as in reactor 1. Furthermore, the reaction mixtures in both reactors will be subject to constant agitation by utililizing conventional mixing devices. In reactor 2, the sulfur content of the diesel oil is further reduced to about 0.3% by weight. The reaction product mixture is withdrawn continuously from reactor 2 and fed to flash chamber 3. The withdrawn product mixture stream may be preheated to a temperature of about 362° C. by utilizing a conventional tube still heater (not shown). Approximately 75% by weight of the reaction product stream fed to flash chamber 3 is vaporized overhead. The flash chamber is operated at atmospheric pressure. The vaporized diesel oil is condensed at 37.8° C. to liquid form in condenser 8 and recovered as the diesel oil product at a rate of about 8,600 lbs./hr. From the bottom of flash chamber 2 a sludge-like material is withdrawn at a rate of about 2,870 lbs./hr. As set forth above, about 2,420 lbs./hr. of this sludge is recycled to reactor 1. About 453 lbs./hr. of the sludge is withdrawn as a purge stream and passed quench tank 6 wherein it is contacted with about 2,000 lbs./hr. of steam. The resulting mixture is passed to decanter 7 and an oil layer is separated from a water waste layer.

EXAMPLE II

In order to demonstrate the unique sodium utilization resulting from practicing the inventive process, a desulfurization run was carried out by initially adding 20 g. of metallic sodium and treating the crude diesel oil as illustrated in the drawing. The crude diesel oil had a sulfur content of 1.19% by weight, a specific gravity at 25° C. of 0.8228, a viscosity of 3.158 centipoises, an initial boil-point of 186° C., and an end boiling point of 304° C. As shown in the following table, seven batches of the diesel oil were treated under autogenous pressure of about 30 p.s.i.g., i.e. under the vapor pressure of diesel oil at the operating temperatures of about 200° to 250° C. Each batch was treated for 1 hour. The results are shown below:

*Table A*

| Batch | Diesel Oil Charged | | Combined Distillates | | Total Sulfur Removed | |
|---|---|---|---|---|---|---|
| | Wt., g. | Tot. Wt., g. | Wt., g. | Av. Percent S | Wt., g. | Atom Ratio—Na:S |
| 1 | 815.0 | 815.0 | 329.0 | 0.000 | 9.70 | 2.87 |
| 2 | 379.0 | 1,194.0 | 680.6 | 0.027 | 14.04 | 1.98 |
| 3 | 381.1 | 1,575.1 | 1,121.4 | 0.146 | 17.11 | 1.63 |
| 4 | 361.3 | 1,936.4 | 1,419.2 | 0.214 | 20.01 | 1.39 |
| 5 | 416.5 | 2,352.9 | 1,817.6 | 0.331 | 22.08 | 1.26 |
| 6 | 408.7 | 2,761.6 | 2,257.2 | 0.415 | 23.48 | 1.18 |
| 7 | 401.2 | 3,162.8 | 2,593.4 | 0.468 | 25.52 | 1.09 |

In a comparative run utilizing the same operating conditions, except for the use of 40 grams of sodium and a hydrogen pressure of 500 p.s.i.g., 17 batches of the diesel were treated for 2 hour periods. Results of this run indicated that the use of a hydrogen atmosphere did not lead to improved sulfur removal over operations at autogenous pressure. The over-all results are as follows:

Table B

| Run No. | Retention Time, Hr. | Temperature, °C. | Pressure, p.s.i.g. | Sodium Used, g. | Sulfur Removed, g. | S Removed/ Na Used | Atom Ratio of Na:S | Residue, Percent of Charge |
|---|---|---|---|---|---|---|---|---|
| 1 | 2 | 200 to 250 | 500 ($H_2$) | 40.0 | 48.8 | 1.22 | 1.14 | 6.7 |
| 2 [1] | 1 | 200 to 250 | 30 (autogenous) | 20.0 | 25.5 | 1.27 | 1.09 | 6.3 |

[1] Example II.

The foregoing demonstrates that the process of this invention can be effectively utilized to desulfurize diesel oil with a considerably higher sodium efficiency than the prior art processes. In addition, the present process does not require the use of hydrogen pressure to obtain these results. Furthermore, the process of this invention has the further advantage of not requiring the extensive separation and recovery steps prescribed by many of the prior art processes.

While particular features of this invention are shown in the above embodiments and in the drawing, it will be understood that the invention is obviously subject to variations and modifications without departing from its broader aspects. Thus, for example, only one reactor or reaction zone can be effectively employed to achieve the results of the present process.

What is claimed is:
1. A continuous process for substantially desulfurizing crude diesel oil with a total amount of sodium equivalent to about 1 gram atom of sodium per 1 gram atom of sulfur present in said crude diesel oil, which consists of continuously contacting crude diesel oil with sludge from a previous desulfurization treatment and less than stoichiometric amounts of fresh sodium, vaporizing substantially desulfurized diesel oil from sludge contained in the resulting reaction product mixture, and continuously recycling a major proportion of said sludge for treatment of said crude diesel oil.

2. The process of claim 1 wherein a minor proportion of the sludge is removed from the process prior to said recycling.

3. The process of claim 1 wherein said desulfurization treatment is carried out in two separate reaction zones with fresh sodium being added to both zones and with the recycled sludge being added only to the first of said zones.

4. The process of claim 1 wherein said desulfurized diesel oil contains less than about 0.5% by weight of sulfur.

5. The process of claim 1 wherein said desulfurization treatment is carried out at a temperature of about 200° to 250° C.

References Cited in the file of this patent

UNITED STATES PATENTS

| 1,859,028 | Cross | May 17, 1932 |
| 1,962,698 | Vose | June 12, 1934 |
| 2,748,058 | Walker | May 29, 1956 |
| 2,772,211 | Hawkes | Nov. 27, 1956 |